United States Patent
Stuttaford et al.

(10) Patent No.: US 9,803,560 B2
(45) Date of Patent: Oct. 31, 2017

(54) DYNAMIC TUNING OF A GAS TURBINE ENGINE TO DETECT AND PREVENT LEAN BLOWOUT

(71) Applicant: ANSALDO ENERGIA IP UK LIMITED, London (GB)

(72) Inventors: Peter John Stuttaford, Jupiter, FL (US); Sumit Soni, Jupiter, FL (US); Donald Gauthier, Jupiter, FL (US); Hany Rizkalla, Stuart, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 646 days.

(21) Appl. No.: 14/213,337

(22) Filed: Mar. 14, 2014

(65) Prior Publication Data

US 2014/0277789 A1 Sep. 18, 2014

Related U.S. Application Data (60) Provisional application No. 61/790,161, filed on Mar. 15, 2013.

(51) Int. Cl.
*F02C 9/22* (2006.01)
*G05B 15/02* (2006.01)
(Continued)

(52) U.S. Cl.
CPC ............... *F02C 9/22* (2013.01); *F02C 9/00* (2013.01); *F02C 9/48* (2013.01); *G05B 15/02* (2013.01); *F05D 2260/964* (2013.01)

(58) Field of Classification Search
CPC ..... F02C 9/22; F02C 9/00; F02C 9/48; G05B 15/02; F05D 2260/964
See application file for complete search history.

(56) References Cited

U.S. PATENT DOCUMENTS 5,584,171 A  12/1996  Sato et al.
6,071,114 A *  6/2000  Cusack ............... F01D 17/02
                                                    340/578
(Continued)

OTHER PUBLICATIONS

Docquier, N. and Candel, S., "Combustion Control and Sensors: A Review", Sep. 15, 2000, Progress in Energy and Combustion Science, 28, 2002, 107-150.*

(Continued)

*Primary Examiner* — Mohammad Ali
*Assistant Examiner* — Kelvin Booker
(74) *Attorney, Agent, or Firm* — Hovey Williams LLP; Peter C. Knops (57) ABSTRACT

A method for tuning a combustor of a gas turbine engine based on one or more monitored operating conditions is provided. One or more operating conditions of the gas turbine engine are monitored. The monitored operating conditions may include, for example, a low frequency tone, a high frequency tone, and a ratio of the low frequency tone to the high frequency tone. It is determined whether the ratio of the low frequency tone to the high frequency tone is within a first predefined normal range. If the ratio of the low frequency tone to the high frequency tone is within the first predefined normal range, a determination is made not to tune the gas turbine engine. But, if the ratio of the low frequency tone to the high frequency tone is not within the first predefined normal range, a determination is made to tune the gas turbine engine.

19 Claims, 8 Drawing Sheets

(51) Int. Cl.
*F02C 9/00* (2006.01)
*F02C 9/48* (2006.01)

(56) References Cited

U.S. PATENT DOCUMENTS

| | | | | |
|---|---|---|---|---|
| 6,135,760 | A * | 10/2000 | Cusack | F01D 17/02 431/12 |
| 6,839,613 | B2 * | 1/2005 | McCarthy | F02C 9/00 60/39.281 |
| 7,269,953 | B2 | 9/2007 | Gadde et al. | |
| 7,469,545 | B2 | 12/2008 | Riley | |
| 8,437,941 | B2 | 5/2013 | Chandler | |
| 9,097,185 | B2 | 8/2015 | Demougeot et al. | |
| 9,328,669 | B2 * | 5/2016 | Rizkalla | F02C 9/22 |
| 2004/0219079 | A1 * | 11/2004 | Hagen | F01K 21/047 422/607 |
| 2005/0050901 | A1 | 3/2005 | Little | |
| 2005/0247066 | A1 * | 11/2005 | Myhre | F01D 17/02 60/803 |
| 2005/0278108 | A1 * | 12/2005 | Norman | F02C 9/00 701/100 |
| 2006/0000219 | A1 * | 1/2006 | Myhre | F01D 17/02 60/772 |
| 2007/0214795 | A1 | 9/2007 | Cooker et al. | |
| 2009/0063003 | A1 * | 3/2009 | Meadows | F01D 21/003 701/100 |
| 2010/0071375 | A1 * | 3/2010 | Myhre | F23M 11/045 60/740 |
| 2011/0040469 | A1 * | 2/2011 | Singh | F23N 5/242 701/100 |
| 2012/0023953 | A1 | 2/2012 | Thomas et al. | |
| 2012/0204534 | A1 * | 8/2012 | Kenyon | F02C 5/12 60/204 |
| 2013/0066615 | A1 | 3/2013 | Morgan et al. | |
| 2013/0073170 | A1 | 3/2013 | Drohan et al. | |
| 2014/0020400 | A1 | 1/2014 | Ceccherini et al. | |
| 2014/0196461 | A1 * | 7/2014 | Soni | F23N 5/16 60/772 |
| 2015/0142188 | A1 | 5/2015 | Terry et al. | |
| 2015/0159563 | A1 * | 6/2015 | Soni | F02C 9/34 60/773 |
| 2015/0185716 | A1 | 7/2015 | Wichmann et al. | |

OTHER PUBLICATIONS

Kalogirou, S.A., "Artificial Intelligence for the Modeling and Control of Combustion Processes: A Review", Jul. 9, 2002, Progress in Energy and Combustion Science, 29, 2003, 515-566.*

Lee, J.G. and Santavicca, D.A., Experimental Diagnostics for the Study of Combustion Instabilities in Lean Premixed Combustors, Sep.-Oct. 2003, Journal of Propulsion and Power, vol. 19, No. 5.*

Non-Final Office Action dated Aug. 31, 2015 in U.S. Appl. No. 14/213,263, 12 pages.

Notice of Allowance dated Dec. 18, 2015 in U.S. Appl. No. 14/213,263, 5 pages.

* cited by examiner

| Name | Min | Max | Units | Value |
|---|---|---|---|---|
| LBOtoHT_Limit_1 | 0.1 | 5 | N/A | 1 |
| LBOtoHT_Limit_2 | 0.1 | 5 | N/A | 1 |
| LBOtoHT_Limit_3 | 0.1 | 5 | N/A | 1 |
| LBOtoHT_Limit_4 | 0.1 | 5 | N/A | 1 |
| LBOtoHT_Limit_5 | 0.1 | 5 | N/A | 1 |
| LBOtoHT_Limit_6 | 0.1 | 5 | N/A | 1 |
| LBOtoHT_Limit_7 | 0.1 | 5 | N/A | 1 |
| LBOtoHT_Limit_8 | 0.1 | 5 | N/A | 1 |
| LBOtoHT_Limit_9 | 0.1 | 5 | N/A | 1 |
| LBOtoHT_Limit_10 | 0.1 | 5 | N/A | 1 |
| LBOtoHT_Limit_11 | 0.1 | 5 | N/A | 1 |
| LBOtoHT_Limit_12 | 0.1 | 5 | N/A | 1 |
| LBOtoHT_Limit_13 | 0.1 | 5 | N/A | 1 |
| LBOtoHT_Limit_14 | 0.1 | 5 | N/A | 1 |
| LBOtoHT_Limit_15 | 0.1 | 5 | N/A | 1 |

- Monitor
- Configuration
  - Comments
  - Hardware
  - Analysis
  - Logic
    - Tuning Limits
    - NX Tuning Limits
    - NX Shift Tuning Limits
    - LBO & HT Tuning Limits
    - LBOtoHT Tuning Limits
    - Tuning Sequence
    - No-Tune CEMS Limits
    - Reference Values
    - Humidity Parameters
    - OOT Check
    - For Dynamics
    - Faulty Pressure Sensors

[HW Write] [HW Read] [Monitor] [Configuration Mode]

FIG. 5

| Name | Min | Max | Units | Value |
|---|---|---|---|---|
| CT_A_Max | 0.1 | 10 | psi [pk-pk] | 2 |
| HHT_A_Max | 0.1 | 10 | psi [pk-pk] | 3 |
| ST_A_Max | 0.1 | 10 | psi [pk-pk] | 3 |
| MinHT_A_For_LBOtoHT | 0.1 | 1 | psi [pk-pk] | 0.5 |

- Monitor
- Configuration
  - Comments
  - Hardware
  - Analysis
    - Logic
      - Tuning Limits
        - NX Tuning Limits
        - NX Shift Tuning Limits
        - LBO & HT Tuning Limits
        - LBOtoHT Tuning Limits
        - Tuning Sequence
        - No-Tune CEMS Limits
        - Reference Values
        - Humidity Parameters
        - OOT Check
        - For Dynamics
        - Faulty Pressure Sensors Configuration Mode HW Write | HW Read | Monitor

DYNAMIC TUNING OF A GAS TURBINE ENGINE TO DETECT AND PREVENT LEAN BLOWOUT

CROSS-REFERENCE TO RELATED APPLICATIONS

This application claims priority to U.S. Provisional Application Ser. No. 61/790,161, filed Mar. 15, 2013, entitled "Dynamic Auto-Tuning of a Gas Turbine Engine," which is incorporated herein in its entirety.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

SUMMARY

Increasingly, a control system is used to regulate the operation of the gas turbine engine. In operation, the control system receives a plurality of indications that communicate the current operating conditions of the gas turbine engine including pressures, temperatures, fuel-flow rates, and engine frequencies. In response, the control system makes adjustments to the inputs of the gas turbine engine, thereby changing performance of the gas turbine engine. Over time, this performance may fall outside a preferred operating range due to mechanical degradation of the gas turbine engine or changes in operational conditions such as ambient temperature or fuel constituents. For instance, the gas turbine engine may start operating beyond regulated emissions limits As such, multiple manual tunings are required to update the control system. Manual tuning can be labor intensive and can sometimes create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during those windows will capture benefits that may be missed when manual tuning is employed in some instances. Nonetheless, manual tuning may still be desirable in some instances, and embodiments of the present invention may be utilized for either automatic or manual tuning.

Initially, various engine operating conditions can be monitored. By way of example, these operating conditions may include, but are not limited to, emissions and combustor dynamics modes, such as lean blowout (LBO), cold tone (CT), low NOx (LoNX), hot tone (HT), high hot tone (HHT), high NOx (HiNX), carbon monoxide (CO), the ratio of lean blowout to hot tone (LBO-to-HT ratio), and screech. In embodiments, a combination of parameters is monitored.

In one embodiment, the operating conditions or parameters of a gas turbine engine, such as those mentioned above, are monitored while one or more conditions of the engine are being incrementally adjusted in order to, among other things, avoid a lean blowout. For example, a measured LBO-to-HT ratio may be monitored to determine whether the measured ratio is between an upper and lower predefined limit If the ratio is outside of the predefined limit, indicating that a lean blowout may occur, a fuel-flow split may be adjusted in small increments. The incremental adjustment can either increase or decrease the selected fuel-flow split (depending type of fuel circuit being adjusted) by a predetermined amount. This process of dynamically selecting and adjusting the fuel-flow splits may be repeated until the measured parameters indicate that the gas turbine engine is operating within a desired range and further indicate that a lean blowout is no longer likely to occur.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As described above, embodiments of the present invention generally relate to automatically tuning a gas turbine (GT) engine in a dynamic fashion. In some instances, tuning of staged GT combustion systems involves adjusting the applied fuel-flow split to ensure that dynamics and emissions are within specified limits As used herein, the phrase "fuel-flow split" refers to an instruction that governs a portion of a total fuel-flow that is directed to each fuel nozzle of a fuel circuit within the combustor.

Specifically, according to embodiments of the present invention, a GT engine may be tuned based on the monitoring of various engine operating conditions. Such operating conditions may include, but are not limited to, emissions and combustor dynamics modes, including lean blowout (LBO), cold tone (CT), low NOx (LoNX), hot tone (HT), high hot tone (HHT), high NOx (HiNX), carbon monoxide (CO), the ratio of lean blowout to hot tone (LBO-to-HT ratio), and screech. In embodiments, a combination of parameters is monitored.

In one embodiment, the operating conditions or parameters of the GT engine, such as those mentioned above, are monitored for the purpose of, among other things, avoiding a lean blowout. Lean blowout, which is sometimes also referred to as a "flame out," of a combustion system can occur when the reaction zone of a combustion system gets too lean, such as when conditions within the GT engine include too much air or too little fuel. If the system runs too lean, a lean blowout may occur, which takes the turbine out of commission for some time and causes a loss in power generating profits. As such, the ability to detect and prevent a lean blowout may be useful. The risk of a lean blowout can be particularly high during tuning, such as when fuel-flow splits are adjusted to establish tuning margins and to reduce dynamics and/or emissions.

One means of preventing a lean blowout is maintaining the amplitude of low frequency dynamics below a specified limit Thus, monitoring the amplitude of low frequency dynamics, which are a lean blowout signature, can be useful in determining the susceptibility of a GT engine to a lean blowout. The details of monitoring and maintaining the amplitude of low frequency dynamics are discussed below. Additionally, a very low NOx emission measurement associated with the combustion system can serve as a precursor to a lean blowout. In some instances, however, the ratio of the amplitude of a low frequency band dynamic to the amplitude of a high frequency band dynamic can be a more reliable indicator of an incipient lean blowout.

For example, a measured LBO-to-HT ratio may be monitored to determine whether the measured ratio is between an upper and lower predefined limit An LBO parameter is indicative of lean operations, such as when emissions are low, while an HT parameter is indicative of rich operations. The LBO-to-HT ratio that is described herein compares a low frequency tone (e.g., LBO) and a high frequency tone (e.g., HT) in order to protect against unstable operations. If the ratio is outside of the predefined range, this may indicate that the combustion system is susceptible to a lean blowout. Accordingly, a fuel-flow split may be adjusted in small increments until the LBO-to-HT ratio falls between the upper and lower predefined limit The incremental adjustment can either increase or decrease the selected fuel-flow split (depending type of fuel circuit being adjusted) by a predetermined amount. This process of dynamically selecting and adjusting the fuel-flow splits may be repeated until the measured parameters indicate that the GT engine is operating within a desired range and further indicate that a lean blowout is no longer likely to occur. It should be noted that multiple combustors, or "cans," may be included in a single turbine. The present invention may be used to monitor operating conditions, including the LBO-to-HT ratio, in each individual can. In other words, the combustion dynamics may be monitored on a per-can basis. Accordingly, each individual can may then be tuned, as needed.

Accordingly, in one embodiment, the present invention is directed to a method for tuning a combustor of a gas turbine engine based on one or more monitored operating conditions. The method includes monitoring the one or more operating conditions of the gas turbine engine. The monitored operating conditions may include, for example, a low frequency tone, a high frequency tone, and a ratio of the low frequency tone to the high frequency tone. The method further includes determining whether the ratio of the low frequency tone to the high frequency tone is within a first predefined normal range. If the ratio of the low frequency tone to the high frequency tone is within the first predefined normal range, a determination may be made not to tune the combustor of the gas turbine engine. On the other hand, if the ratio of the low frequency tone to the high frequency tone is not within the first predefined normal range, a determination may be made to tune the combustor of the gas turbine engine in order to avoid a lean blowout.

In further embodiments, a system is provided for tuning a combustor of a gas turbine engine based on one or more monitored operating conditions. The system may include an acquisition component for receiving values associated with the one or more operating conditions of the gas turbine engine. The one or more operating conditions may include a low frequency tone, a high frequency tone, and a ratio of the low frequency tone to the high frequency tone. The system may further include a processing component for determining that a value associated with the ratio of the low frequency tone to the high frequency tone is not within a first predefined normal range, and for determining that a value associated with the high frequency tone is within a second predefined normal range. Finally, an adjustment component may be included for adjusting a fuel-flow split to the combustor of the gas turbine engine in order to avoid a lean blowout, based on the determining steps performed by the processing component.

In yet another embodiment, a method for tuning a combustor of a gas turbine engine based on one or more monitored operating conditions is provided. The method includes monitoring the one or more operating conditions of the gas turbine engine. The one or more operating conditions may include, at least, a low frequency tone, a high frequency tone, and a ratio of the low frequency tone to the high frequency tone. Additionally, the method provides for determining whether the ratio of the low frequency tone to the high frequency tone is within a first predefined normal range, and determining whether the high frequency tone is within a second predefined normal range. If the ratio of the low frequency tone to the high frequency tone is not within the first predefined normal range but the high frequency tone is far outside the second predefined normal range such that its value is artificially low, a determination may be made to not tune the combustor based on the one or more monitored operating conditions. Alternatively, if the ratio of the low frequency tone to the high frequency tone is not within the first predefined normal range and the high frequency tone is within the second predefined normal range, a determination may be made to initiate tuning of the combustor such that the ratio of the low frequency tone to the high frequency tone not being within the predefined normal range indicates susceptibility of a particular can to lean blowout.

As one skilled in the art will appreciate, embodiments of the present invention may be embodied as, among other things, a method, a system, or a computer-program product. Accordingly, the embodiments may take the form of a hardware embodiment, a software embodiment, or an embodiment combining software and hardware. In one instance, embodiments of the present invention take the form of the computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
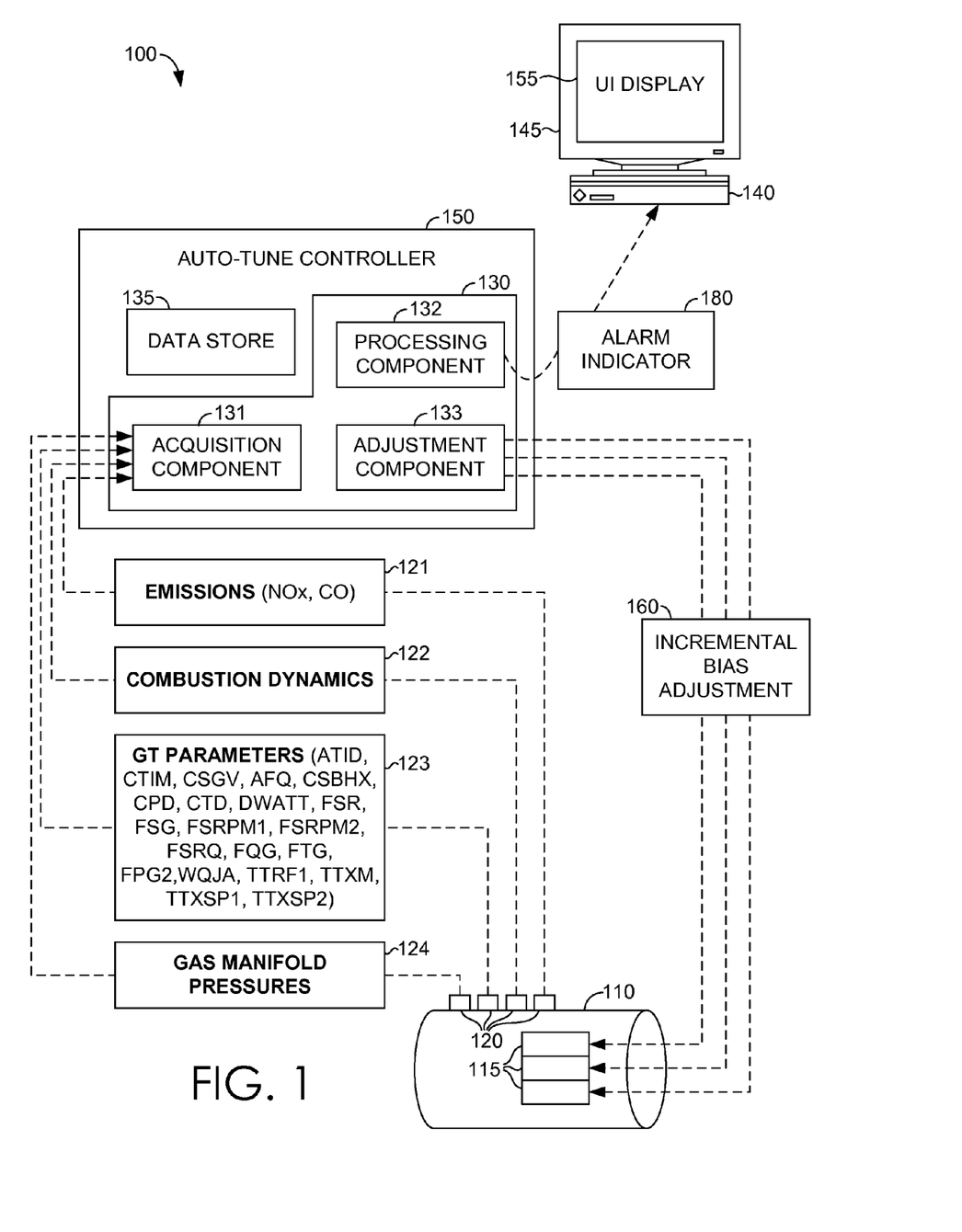
FIG. 1 is a block diagram of an exemplary tuning environment suitable for use in embodiments of the present invention.

Turning now to the figures, with reference to FIG. 1, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the gas turbine (GT) engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium. Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions.

Continuing on with reference to FIG. 1, a GT engine 110 is depicted that accommodates a plurality of combustors 115. Utilizing embodiments of the present invention, an operating condition of the GT engine 110, such as a fuel-flow split, for example, may be incrementally adjusted while monitoring various parameters and operating conditions, including, for example, LBO, CT, LoNX, HT, HHT, HiNX, CO, LBOtoHT, screech, and the like. As such, FIG. 1 is provided herein as a depiction of an exemplary GT engine 110, and is described with respect to various embodiments as to how the GT engine 110 may be dynamically and automatically tuned.

Generally, for the purpose of discussion, the GT engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustions, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby, can be applied to any number of configurations of GT engines and that the type of GT engines describe herein below should not be construed as limiting on the scope of the present invention.

As discussed above, the plurality of combustors 115 (e.g., low emission combustors) may be prone to elevated levels of pressure fluctuation within the combustor liner. These pressure fluctuations are referred to as "combustion dynamics." Left alone, combustion dynamics can have a dramatic impact on the integrity and life of the plurality of combustors 115, eventually leading to catastrophic failure.

More specifically, pressure-pulse fluctuations, also called combustion dynamics, may be detected (e.g., utilizing pressure transducers) in each combustor of the GT engine and may be communicated as pressure signals. Next, in embodiments, a Fourier Transform or other transformative operation may be applied to the pressure signals, in order to convert the pressure signals into an amplitude versus frequency plot. Upon examination of the amplitude versus frequency plot, an amplitude may be compared against a predetermined upper or lower pressure limit, or alarm level limit Further, when outside an optimal operating range, the GT engine 110 may emit emissions with properties that are unacceptable (i.e., exceed a predefined threshold). In embodiments, these properties of the GT engine 110 emissions may include "emission composition," which may be measured from the GT engine using a monitoring device (e.g., continuous emission monitoring system (CEMS)). By way of example, the emission composition may be measured in units of parts per million (ppm) for each of mono-nitrogen oxides (NOx) and carbon monoxide (CO), while O2 may be measured in percent (%) composition. As such, "emission compositions" relate to the amount of pollutant that is generated by the GT engine 110. Once the emission composition is measured, it is compared against a critical value, such as a critical maximum or minimum value, to determine whether the emission composition is acceptable.

These effects of elevated combustion dynamics and/or unacceptable emission compositions may be mitigated or cured by adjusting fuel-flow splits of the combustor gas flow between several groups of nozzles within the plurality of combustors 115. Generally, a fuel-flow split may be adjusted for each of the plurality of combustors 115; thus, the combustors (burners) may be tuned alike, as opposed to tuning at the individual burner level. These different fuel-flow splits are occasionally tuned to ensure that acceptable levels (conventionally low levels) of the combustion dynamics are maintained while, at the same time, promoting acceptable emission compositions.

Schedules that govern which fuel-flow split will be adjusted for each fuel circuitare may be hard coded into a control system (not shown) of GT engine 110. In one instance, these schedules are a function of a reference that could be, amongst other things, a turbine inlet reference temperature (TTRF) or a user-defined/specific load on the GT engine 110. Over time, several parameters will affect the combustion dynamics. In particular, ambient condition changes and/or gas composition variation and/or normal wear may degrade the operation of the GT engine. This degradation may lead to regular "re-tuning" of the combustor to maintain combustion dynamics and emission composition within acceptable limits In embodiments, various parameters representing the combustions dynamics and/or emission compositions may be continually monitored while certain conditions are being adjusted. As such, in embodiments, it is not determined whether the parameters are unacceptable or out of range prior to adjusting an operating condition, but instead, parameters that are determined to be within predefined upper and lower limits are continuously monitored while an operating condition (e.g., fuel-flow split) is being incrementally adjusted.

As discussed herein, a control system for carrying out automated tuning, or the auto-tune controller 150 of FIG. 1, is used to assess the state of the GT engine 110 and the plurality of combustors 115 in terms of parameters such as the combustion dynamics, air flow, fuel-flows, emissions, and pressure distribution. These parameters of the GT engine 110 may be continually monitored while an operating condition, such as a fuel-flow split, is adjusted incrementally. In one embodiment, an alarm it utilized to detect when any of the monitored parameters are outside of a predefined range, thus notifying the operator by way of the alarm indicator 180. The alarm may be set upon detecting that any one of the monitored parameters either falls below or above a predetermined upper or lower limit and/or upon recognizing that the composition of the combustor emissions has exceeded a particular critical value while an operating condition is being incrementally adjusted. Accordingly, embodiments of the present invention concern the auto-tune controller 150, as well as the associated tuning process, that enables automatic tuning of the combustion dynamics and emissions using small incremental changes of an operating condition of the GT engine 110, such as a fuel-flow split.

An overall tuning process carried out by the auto-tune controller 150 may comprise one or more of the steps described immediately below. Initially, in one embodiment, various configurations of pressure signals and emissions compositions of the plurality of combustors 115 are monitored and recorded. These recorded pressure signals may be passed through a Fourier Transform or another transformative operation, where the pressure signals are converted into an amplitude versus frequency data format or spectrum. The values of the emissions compositions may also be read and maintained. The amplitude, values, and frequencies may then be compared against a predetermined upper or lower limit for each predefined frequency band, while the emission-composition parameters are compared against predefined critical values. The predetermined limit may be defined, for example, in terms of pounds per square inch (psi) for a predefined frequency band, while the critical values may be defined in terms of parts per million (ppm) or percentage. However, in other instances, the predetermined limits and critical values may be expressed in other terms or units, where other types are devices are used to measure performance of the combustors 115 (e.g., accelerometers). Embodiments of the present invention may include a combustion dynamic monitoring system (CDMS) that monitors several frequency bands of the combustor signature. Low frequency bands indicate the system is running too lean, and high frequency bands indicate the system is running on the rich side, such as might be associated with over firing. If the determination is made that one or more of the frequency-based amplitude exceeds its respective predetermined limit(s) for a predetermined frequency band, or one or more gases comprising the emission composition surpasses its respective critical values, then the auto-tune controller 150 may dynamically select a fuel-flow split to adjust and then may adjust the selected fuel-flow split a single time at a predefined amount, or a predefined increment.

As described herein, the phrase "predefined increment" is not meant to be construed as limiting, but may encompass a wide range of adjustments to the fuel-flow splits. In one instance, the predefined increment is a uniform amount of adjustment that is consistently applied to one or more of the fuel-flow splits. In another instance, the predefined increment is a varied amount of adjustment that is altered across fuel-flow splits or across individual adjustments to a particular fuel-flow split. By altering the increment of the fuel-flow splits in this manner, the fuel-air mixing within the combustor is changed, thus, affecting the combustion dynamics. Also, upon affecting the combustion dynamics, the pressure fluctuations are also altered. The amplitude(s) of the altered pressure fluctuations and/or the data point(s) of the altered emissions composition, as well as the other parameters, once stabilized, are again measured and recorded. These altered parameters may then be used to recalculate each of the slopes included in the fuel-flow-split plots. Further, these recalculated slopes may be stored within a slopes schedule for future analysis.

As mentioned, the auto-tune controller 150 is generally responsible for assessing the state of the GT engine 110 based on various parameters, emissions, operating conditions, etc., and incrementally adjusting a condition of the GT engine 110 based on a specific need, such as needing to avoid a lean blowout in the GT engine 110. In embodiments, the auto-tune controller 150 comprises a processing unit, which includes, at least, an acquisition component 131, a processing component 132, and an adjustment component 133. The acquisition component 131 generally receives or gathers current values of parameter conditions from the emissions 121, combustion dynamics 122, GT parameters 123, gas manifold pressures 124, etc. The processing component 132 may then take the values of the gathered parameters and compare these values to predetermined values, such as upper and lower values, or threshold values, that indicate a desired or predefined value for the parameter. As such, the processing component 132 has access to the parameter values acquired by the acquisition component 131, and also the predefined boundaries which define the normal limits of a particular parameter. The processing component 132 is then able to make a comparison to determine whether the current parameter value being monitored is within normal predefined limits The adjustment component 133 receives input when an adjustment is to be made. For instance, if a fuel-flow split is to be adjusted, the adjustment component 133 may send a signal through the incremental bias adjustment 160, which affects a change in the GT engine 110. As such, the fuel-flow split may be adjusted based on a command from the adjustment component 133.

Once the single, fuel-flow split adjustment is made, the process may be reiterated. That is, the steps of (a) monitoring and comparing the amplitude for a number of predetermined frequency bands to the predetermined limits, such as comparing a measured ratio of a low frequency tone to a high frequency tone to a predefined normal range, (b) selecting a fuel-flow split, which may, for example, be selected using schedules, and (c) making an incremental adjustment to the selected fuel-flow split may be repeated if the dynamic pressure amplitude falls outside predetermined limit(s), such as when a measured ratio of a low frequency tone to a high frequency tone falls outside a predetermined limit As such, in instances, when the dynamic pressure amplitude is ascertained to surpass the predetermined limit(s), a predetermined adjustment may be made to the previously selected fuel-flow split or a different fuel-flow split.

The tuning process may be repeated as required until the dynamic pressure amplitude falls within the predetermined range of limits, until the emission composition resides within an acceptable range that does not exceed the critical values, or until some other criteria is triggered that indicates the fuel-flow split should not be adjusted any further. For instance, if a fuel-flow split that is selected through use of a schedule, as more fully discussed below, cannot be adjusted further, then an alarm indication is issued to an operator.

In embodiments, the measured amplitude of the altered pressure fluctuations and/or altered emissions composition may be again compared against the predetermined upper or lower limits and/or critical values, respectively, to verify whether the adjusted fuel-flow split has moved the combustion dynamics and/or emissions composition within an acceptable range. If the measured amplitude continues to exceed the predetermined limit(s), or the emissions-composition measurements continue to exceed the critical values, the same or another fuel-flow split may be adjusted by a predefined increment and the process is recursively repeated as necessary. In an exemplary embodiment, adjustments are made to each of the various fuel-flow splits consistently and uniformly (at the same predetermined increment), thereby saving processing time to compute a customized value of an increment each time an adjustment is requested by the control system.

Although a dynamic scheme for iteratively selecting a fuel-flow split for adjustment, adjusting the selected fuel-flow split a predefined increment, and repeating has been described immediately above, it should be understood and appreciated by those of ordinary skill in the art that other types of suitable schemes that select and adjust fuel-flow splits may be used, and that embodiments of the present invention are not limited to those schemes that dynamically select a fuel-flow split. For instance, one embodiment of the tuning scheme may iteratively adjust the selected fuel-flow split by a predefined increment and pause for a period of time before repeating the process of measuring the parameters from the combustor. This way, the combustor may be allowed to stabilize upon the occurrence of the fuel-flow-split adjustment.

Continuing on with respect to FIG. 1, the auto-tune controller 100 is provided with the data store 135. Generally, the data store 135 is configured to store information associated with the tuning process or data generated upon monitoring the GT engine 100. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For example, the data store 135 may store predetermined upper and lower limits for a plurality of parameters that may be monitored while adjusting an operating condition. Further, the data store 135 may store values that correspond to the adjusted operating condition. For instance, the data store 135 may be searchable for dynamic schedules in order to determine which fuel-flow split to increment upon comparing the measured dynamic pressure amplitudes to corresponding predetermined limit(s) and upon comparing the measured emissions compositions to corresponding critical values, respectively. For example, if the fuel-flow split is adjusted until a monitored parameter is out of a normal range, the fuel-flow split before the parameter was out of range may be saved in the data store 135 for future reference. This is particularly useful when, in the future, ambient conditions are similar. These values can then be accessed and retrieved from the data store 135 and used in future tunings. It will be understood and appreciated that the information stored in the data store 135 may be configurable and may include any information relevant to the tuning process. The content and volume of such information are not intended to limit the scope of embodiments of the present invention.

Figure 2:
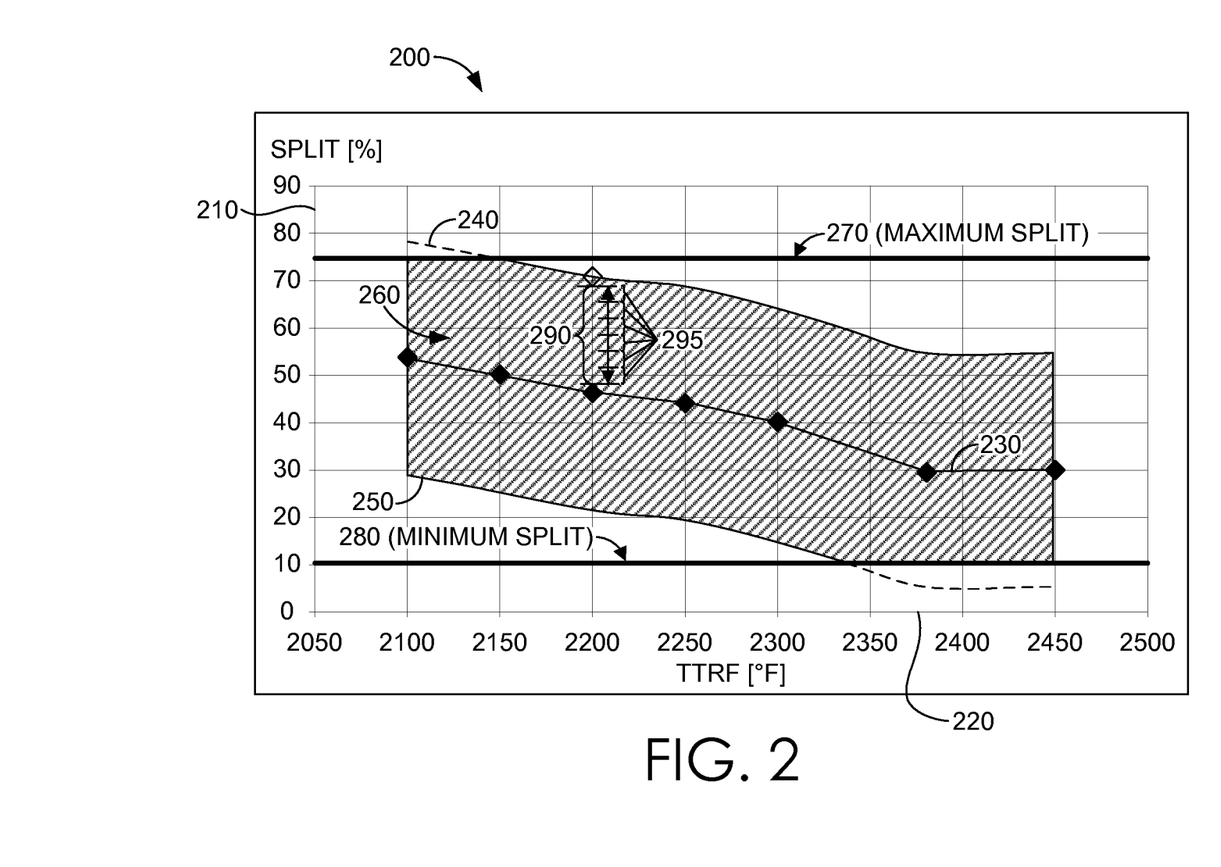
FIG. 2 is an exemplary diagram depiction of a graph that illustrates a tuning region for a particular parameter, in accordance with an embodiment of the present invention.

Accordingly, in one exemplary embodiment of the process of auto-tuning, the control system is configured for monitoring and controlling the GT engine. This control system may manage a majority of the processes involved in auto-tuning the combustor, and may be referred to as an auto-tune controller (see reference numeral 100 of FIG. 1). Initially, the process may include monitoring the combustion dynamics and emissions of the combustor for a plurality of conditions. Upon determination that one or more of the conditions exceeds predetermined limit(s), a fuel-flow split to a fuel circuit may be adjusted by a predetermined amount. The control system, or auto-tune controller, may then continue to monitor the combustion dynamics and to dynamically adjust the fuel-flow split by the predetermined amount until the combustion dynamics fall below the predetermined upper limit Further, in another exemplary embodiment of the process of auto-tuning, the GT engine is monitored and, based on the data recovered from monitoring, a fuel-flow split is selected and automatically adjusted a single increment. The automatic adjustment may involve incrementing upward or downward the selected fuel-flow split in order to maintain combustion dynamics and emission composition within a preferred operating range, or above/below a limit With reference to FIG. 2, the graph 200 shows an illustrative tuning region 260 (shaded area) that surrounds a base-line curve 230 for a subject fuel-flow split, where the base-line curve 230 is typically established upon commissioning the combustor. In an exemplary embodiment, the tuning region 260 is bounded by a maximum split 270 (maximum tune margin) and an upper tuning boundary 240 on the top, and by a minimum split 280 (minimum tune margin) and a lower tuning boundary 250 on the bottom. In operation, by way of example, the combination of the maximum split 270 and the upper tuning boundary 240 defines the upper boundary, which limits the amount of positive bias 290 that may added to a particular fuel-flow split. That is, the upper boundary may create an artificial limit that prevents the auto-tune controller 100 from iteratively adjusting the particular fuel-flow split beyond the acceptable positive bias 290.

Further, the positive bias 290 may be divided into steps 295 that are used to incrementally adjust the fuel-flow split upward therein. These steps 295 may be proportionately sized and divide the positive bias 290 evenly, or may be of varying sizes (e.g., logarithmically scaled to introduce a large increment initially, and a small increment when closing in on the top boundary). Although not depicted in FIG. 2, a negative bias that is divided into steps may be used establish an amount of negative incremental adjustment for a particular fuel-flow split.

As discussed above, certain operating conditions, such as lean blowout (LBO), cold tone (CT), low NOx (LoNX), hot tone (HT), high hot tone (HHT), high NOx (HiNX), carbon monoxide (CO), the ratio of lean blowout to hot tone (LBO-to-HT ratio), and screech, can be compared against predefined limits and/or predefined threshold values to determine whether the combustor is running efficiently within an acceptable performance range. If none of the parameters are determined to surpass a corresponding set of limits and/or values, then the auto-tune controller 100 may determine that the combustor's performance is aligned with satisfactory operational characteristics, and no fuel-flow split adjustment may be deemed necessary. Yet, if one or more of the parameters, upon comparison, is measured at an amplitude and/or value outside its respective predefined limit and/or value, thus identified as "out of tune," then one or more of the tuning processes described herein may be automatically invoked.

In embodiments of the present invention, a ratio of an amplitude of a low frequency band dynamic (e.g., LBO) to the amplitude of a higher frequency band dynamic (e.g., HT) is monitored as an indication of incipient lean blowout. That is, in addition to monitoring and tuning for dynamics and emissions according to some of the other operating conditions mentioned above, such as conventional monitoring of only a low frequency (e.g., LBO) parameter, the same may be done according to a ratio of the amplitude of two dynamic frequency bands. Such monitoring and tuning based on a ratio of LBO-to-HT may provide for more robust decision making with respect to the detection of and protection against an incipient LBO. Notably, this new parameter may be used with or without AutoTune. As such, it may be used for manual tuning or automatic tuning.

Embodiments of the present invention have been programmed into a PSM AutoTune system for a GE 7FA engine with DLN 2.6 combustion system. In this exemplary implementation, the PM1, PM3, and QUAT fuel-flow splits are automatically incrementally adjusted to ensure that the ratio of LBO dynamics to HT dynamics, for instance, remain within a specified limit, thereby protecting against lean blowout events.

Figure 3:
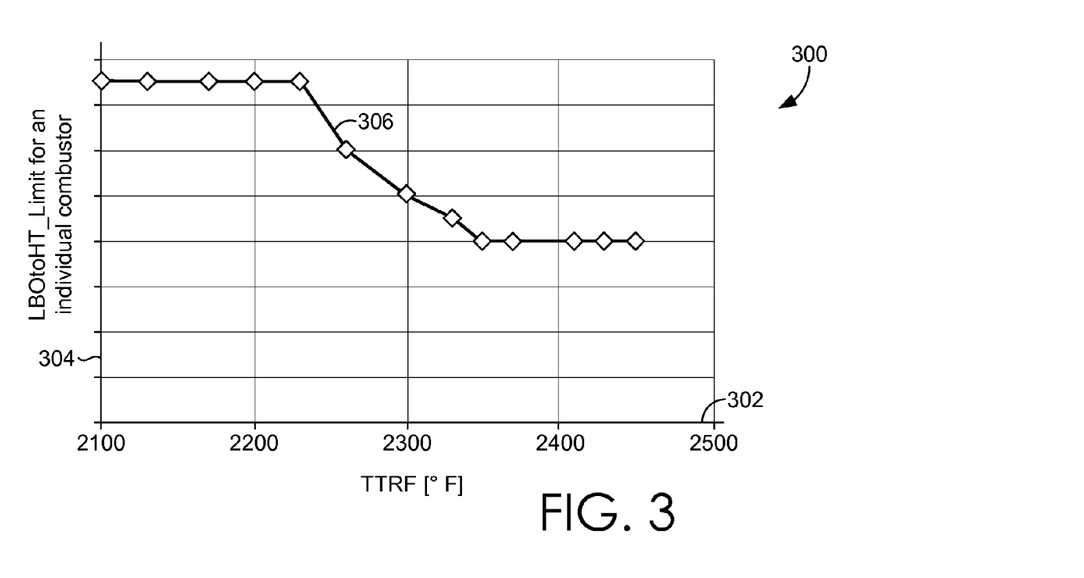
FIG. 3 is an exemplary diagram depiction of a graph that illustrates an LBO-to-HT tuning limit as a function of turbine inlet reference temperature, in accordance with an embodiment of the present invention.

The present invention can, among other things, help prevent a lean blowout while monitoring and/or tuning the combustion system of a GT. Embodiments of the present invention may be well suited for PSM AutoTune where the LBO-to-HT limit can be specified as a function of firing temperature or load. For example, FIG. 3 illustrates an LBO-to-HT limit 306 as a function of turbine inlet reference temperature (TTRF), or firing temperature. In other words, in FIG. 3, the LBO-to-HT limit is a schedule vs. TTRF. The firing temperature appears on the x-axis 302, and the LBO-to-HT limit appears on the y-axis. It will be understood that while a ratio of LBO-to-HT is described herein, this is not meant to limit the invention in any way, but instead to provide an example. The ratio is of a low frequency band dynamic amplitude to a high frequency band dynamic amplitude is illustrated in FIG. 3, but in other embodiments, parameters other than LBO and HT may be used. In some embodiments, a lower limit and upper limit are set to define a normal range for the LBO-to-HT ratio.

Figure 5:
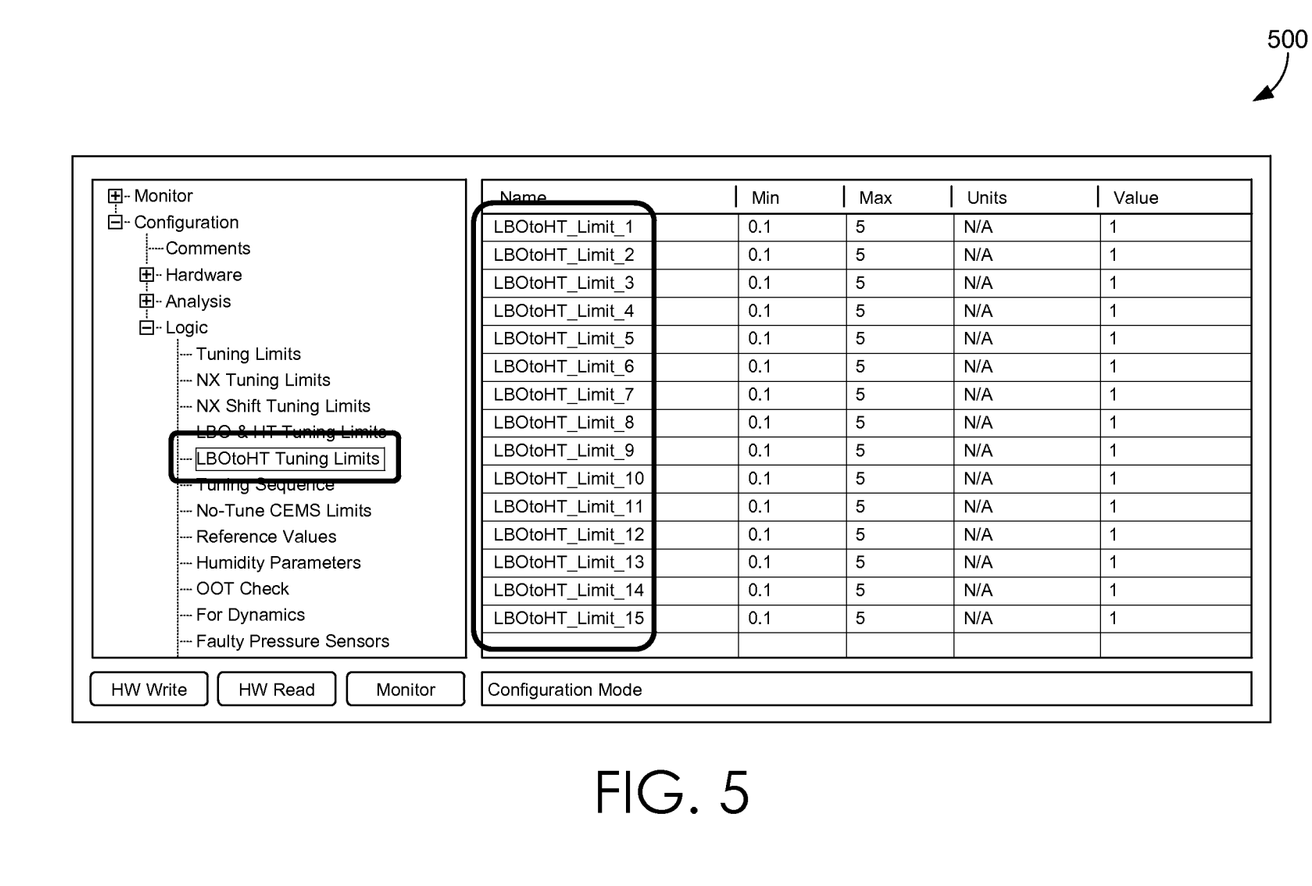
FIG. 5 is a graphical user interface that displays LBO-to-HT tuning limits, in accordance with an embodiment of the present invention.

The LBO-to-HT ratio limit may be predefined. For exemplary purposes only, if this ratio is set to 0.5, the value of LBO over HT for a particular can needs to be at or near that value of 0.5. In embodiments, the LBO-to-HT ratio limit is set to 0.5. This LBO-to-HT ratio may be a user defined value. The graphical user interface 500 of FIG. 5 provides for the creation, modification, or review of LBO-to-HT tuning limits The use of the LBO-to-HT ratio for determining susceptibility of LBO in a turbine can has not been previously used, and therefore, embodiments of the present invention provide a novel means of detecting lean blowout operations that may have been previously undetected when looking at individual operating parameters separately, instead of in the form of a ratio. The addition of the LBO-to-HT ratio to conventional criteria used in detecting and preventing lean blowouts will enable the detection of instabilities in cans that may have previously been deemed stable according to conventional monitoring techniques. Thus, the present invention enables the prevention of lean blowouts in turbine cans.

In some instances, a portion of the cans in a turbine may be associated with a high LBO parameter, but may also be associated with a healthy hot tone. In such a case, those particular cans may be within desirable operating condition limits and may not be at risk for a lean blowout, despite the high LBO values. Another can, however, may have a lean blowout value that is below a predefined limit, but may also have a hot tone value that is lower than a predefined limit This may be an indication that the particular can is running excessively lean, but such a detection cannot be made by looking only at an LBO level, or any other parameter individually, because the LBO level is within a predetermined normal range. In accordance with embodiments of the present invention, however, the ratio of LBO-to-HT is monitored and the potential for a lean blowout in this latter situation may be detected and the combustion system may be tuned, accordingly. In this way, the present invention is distinguished from conventional monitoring systems that consider only an LBO limit, and if such limit is exceeded, invoke an LBO tuning algorithm. As illustrated in the example above, such conventional systems may not always detect an incipient lean blowout.

If the LBO-to-HT ratio falls outside of a predefined normal range, or exceeds a predetermined threshold value, the hot tone value, alone, may be examined before determining whether the can is susceptible to a lean blowout. For example, if the hot tone value is artificially very low, or if the hot tone value is suspected to include excessive noise from the signal, then the LBO-to-HT ratio may not accurately indicate whether the can is susceptible to a lean blowout. In this instance, the LBO-to-HT tuning logic may not be applied. Thus, in embodiments, the ratio of LBO-to-HT may first be considered, and then the HT value, alone, may be considered. According to these considerations, the LBO-to-HT logic may or may not be implemented in order to tune the system for the purpose of preventing a lean blowout.

Figure 4:
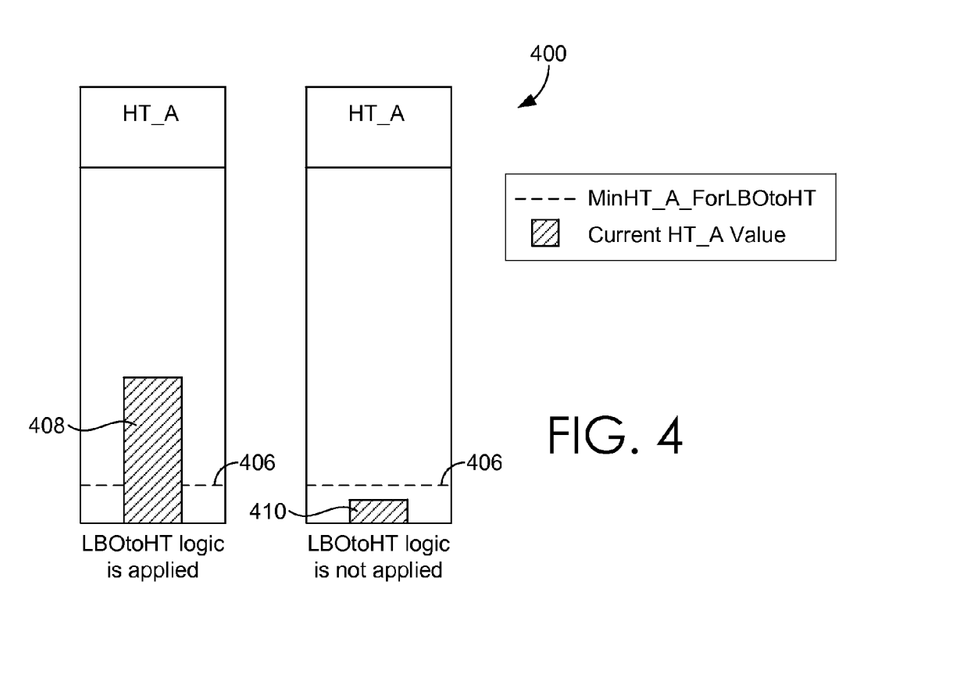
FIG. 4 is an exemplary diagram depiction of a predefined normal range for an HT value, in accordance with an embodiment of the present invention.
Figure 6:
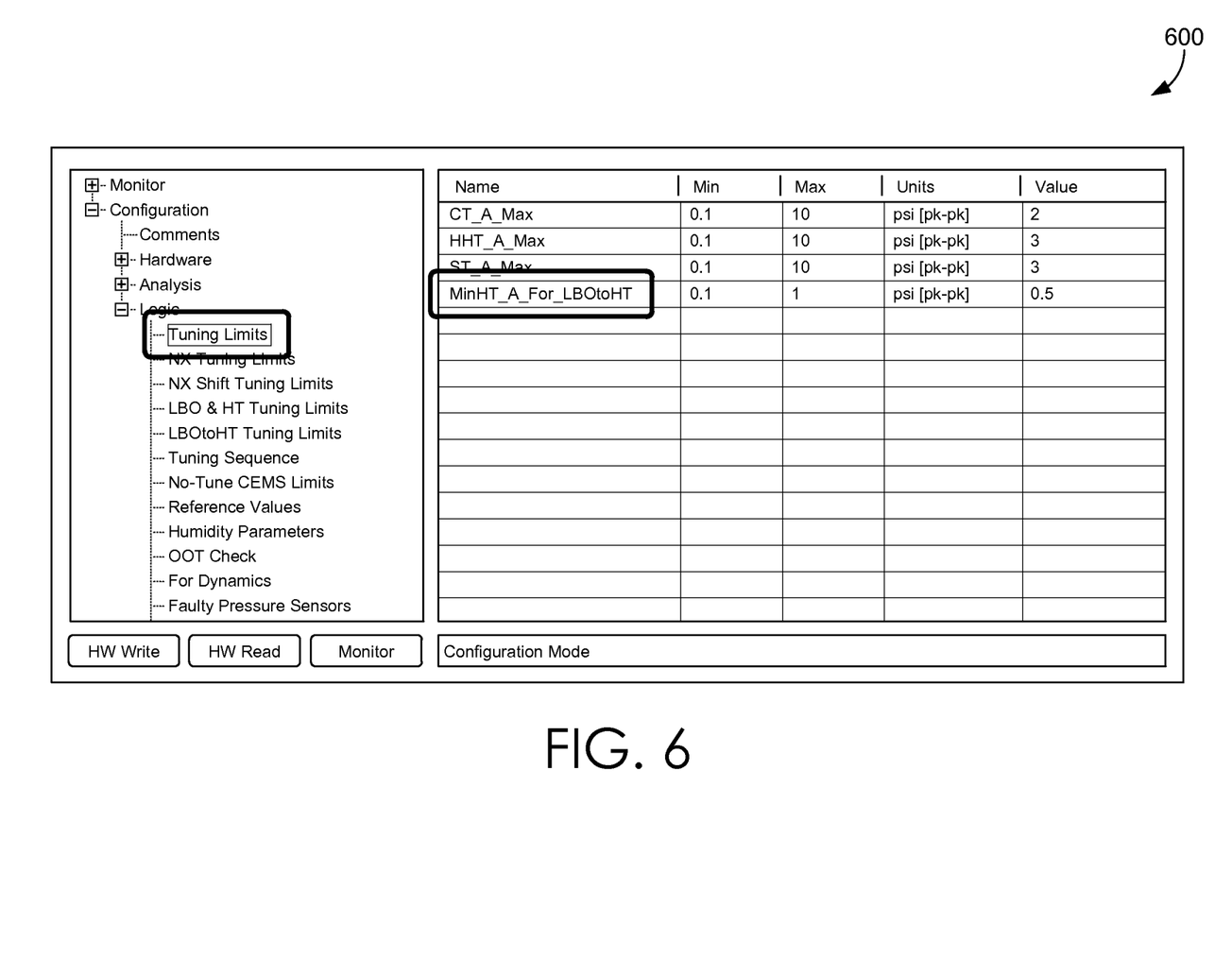
FIG. 6 is a graphical user interface that displays a predefined normal range for an HT value, in accordance with an embodiment of the present invention.

For example, the HT threshold visualization 400 in FIG. 4 illustrates a minimum HT threshold 406 that corresponds to a predefined normal range for HT values. In some embodiments, a measured HT value must satisfy this threshold, or the measured HT value must fall within the predefined normal range, in order for LBO-to-HT tuning logic to be applied. The HT value 408 satisfies the HT threshold 406 and, as such, the LBO-to-HT logic is applied. On the other hand, the HT value 410 does not satisfy the HT threshold 406 and, as such, the LBO-to-HT logic is not applied. Furthermore, FIG. 6 provides a graphical user interface 600 that may be used for creating, modifying, or reviewing threshold values and other related values for determining whether an HT value is sufficiently high, or within a predefined normal range, for the LBO-to-HT logic to be applied.

To summarize, the LBO-to-HT ratio is relevant to a number of scenarios, including, but not limited to, the following. In one scenario, if an LBO value is within normal limits, but an LBO-to-HT value is outside of normal limits, the can may be deemed to be unstable and tuning is performed to avoid a lean blowout. In some instances, this tuning may alter fuel-flow splits for the entire turbine, even though the LBO-to-HT and other system parameters are measured for a particular can within the turbine. In an alternative embodiment, adjustments may be made on a per-can basis.

In another scenario, the hot tone value may be extremely low, or below normal limits (e.g., a threshold level or a noise threshold level), which causes the LBO-to-HT ratio to be outside of its normal limits If the hot tone is sufficiently low, this may indicate that the hot tone value includes noise in the signal, or is artificially low. As such, when the LBO-to-HT value exceeds normal limits, the HT value may be considered individually, to determine whether an abnormally low HT value is skewing the ratio such that it may not be a good indicator of the possibility of lean blowout in that particular can. In this instance, it may be determined that no action, such as tuning, is necessary, and the system may continue to function normally.

In other scenarios, the LBO-to-HT ratio may be used to determine that the turbine is within normal operating conditions and that tuning is therefore not required. For example, if both the LBO value and the LBO-to-HT value are within normal limits, no tuning is required. These scenarios are intended to be exemplary only, and are included in order to illustrate some of the many instances in which the present invention may be implemented. These examples are not intended to limit the scope of the present invention, and it is understood that the present invention may be applied to many other scenarios.

Figure 7:
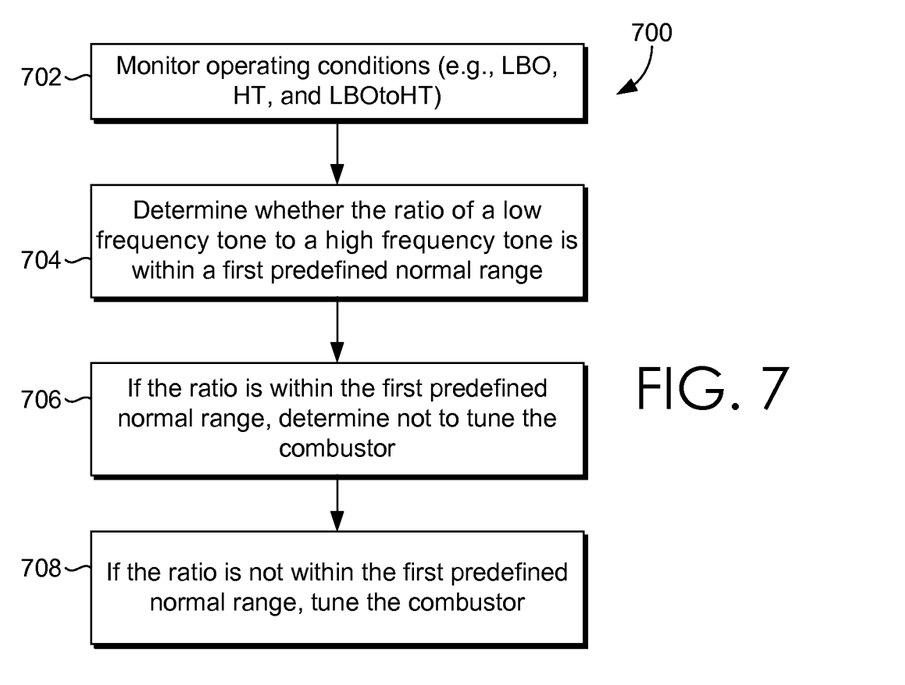
FIG. 7 is a flow diagram including steps for determining whether to tune a combustor of a gas turbine engine, in accordance with an embodiment of the present invention.

Turning now to FIG. 7, a flow diagram 700 includes steps for determining whether to tune a combustor of a gas turbine engine, in accordance with an embodiment of the present invention. At step 702, operating conditions of the gas turbine engine are monitored. The monitored operating conditions may include, for example, LBO, HT, and LBO-to-HT ratio. A determination is made at step 704 as to whether a ratio of a low frequency tone to a high frequency tone is within a first predefined normal range. At step 706, if the ratio is within the first predefined normal range, a determination is made not to tune the combustor. Alternatively, if the ratio is not within the first predefined normal range, a determination to tune the combustor is made at step 708.

Figure 8:
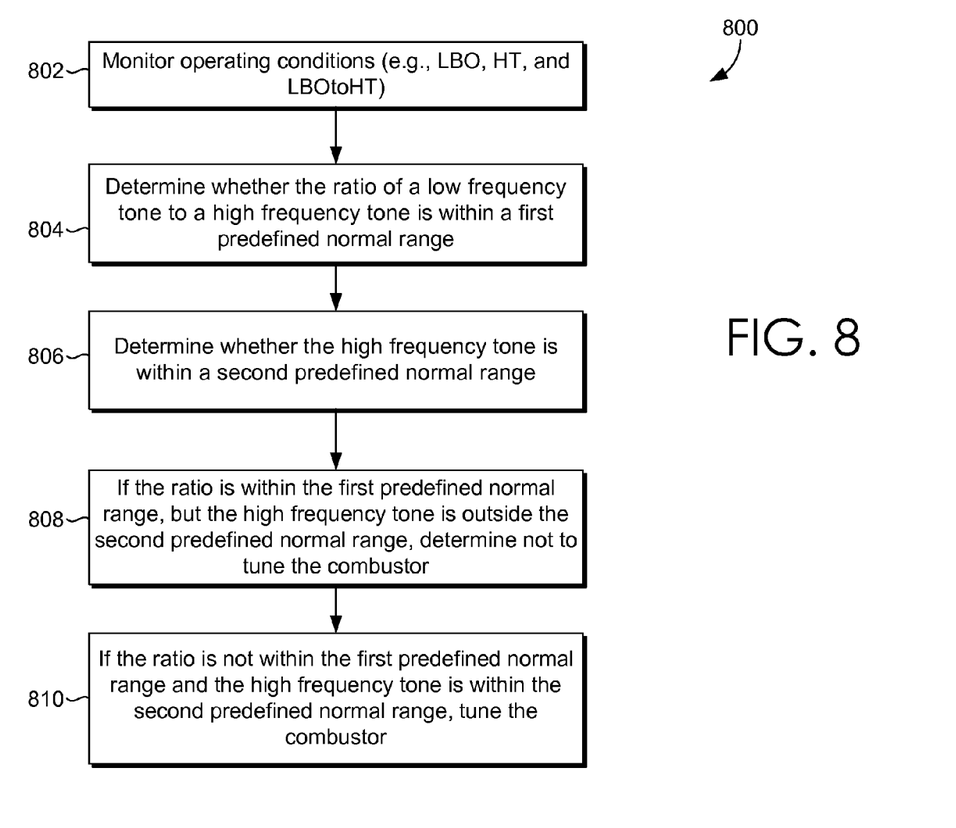
FIG. 8 is a flow diagram including steps for determining whether to tune a combustor of a gas turbine engine, in accordance with an embodiment of the present invention.

The flow diagram 800 of FIG. 8 also includes steps for determining whether to tune a combustor of a gas turbine engine, in accordance with an embodiment of the present invention. At step 802, operating conditions of the gas turbine engine are monitored. The monitored operating conditions may include, for example, LBO, HT, and LBO-to-HT ratio. A determination is made at step 804 as to whether a ratio of a low frequency tone to a high frequency tone is within a first predefined normal range. At step 806, it is determined whether the high frequency tone is within a second predefined normal range. In embodiments, the first predefined normal range is a first predefined threshold value and the second predefined normal range is a second predefined threshold. If, at step 808, the ratio is within the first predefined normal range, but the high frequency tone is outside the second predefined normal range, a determination is made not to tune the combustor. At step 810, however, if the ratio is not within the first predefined normal range and the high frequency tone is within the second predefined normal range, the combustor is tuned. Tuning may involve adjusting a fuel-flow split by a first predetermined amount.

In embodiments, the method described with respect to FIG. 8 may further include, subsequent to adjusting the fuel-flow split, monitoring the one or more operating conditions to obtain a new low frequency tone, a new high frequency tone, and a new ratio of the new low frequency tone to the new high frequency tone. The method may further include determining whether the new ratio is within the first predefined normal range, and determining whether the new high frequency tone is within the second predefined normal range. In embodiments, if the new ratio is not within the first predefined normal range and the new high frequency tone is within the second predefined normal range, adjusting the fuel-flow split by a second predefined amount.

Figure 9:
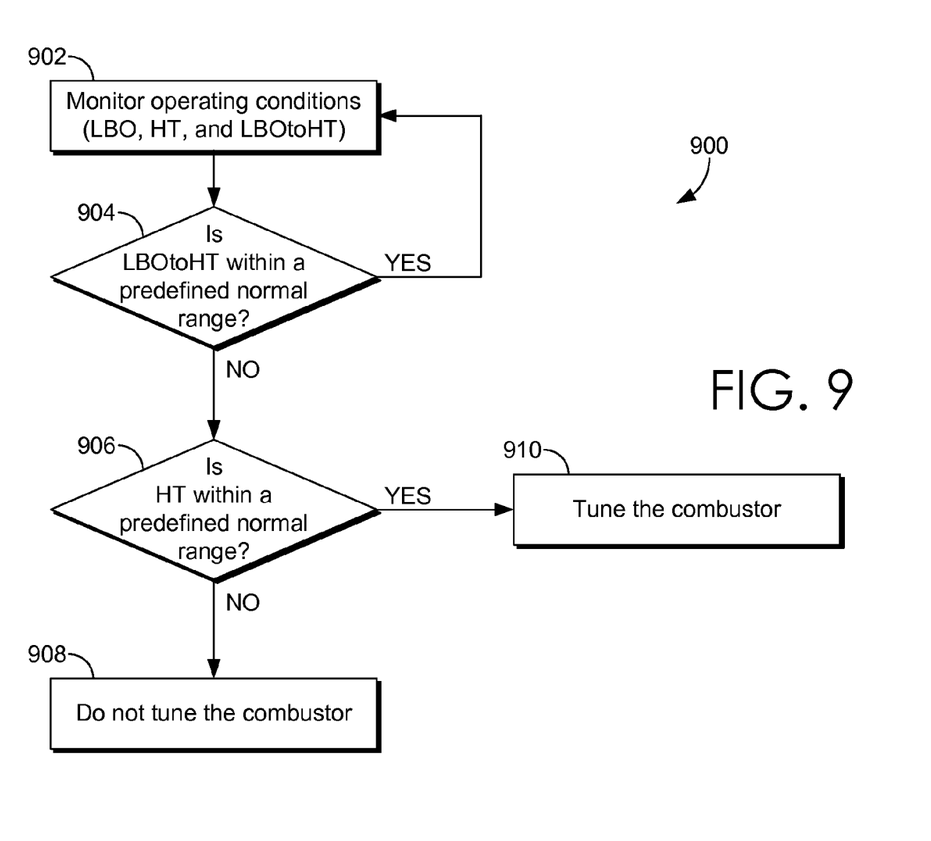
FIG. 9 is a flow diagram including steps for determining whether to tune a combustor of a gas turbine engine, in accordance with an embodiment of the present invention.

Turning now to FIG. 9, flow diagram 900 shows various steps related to a determination as to whether or not to tune a combustor of a gas turbine engine. At step 902, operating conditions of the gas turbine engine are monitored. The monitored operating conditions may include, for example, LBO, HT, and LBO-to-HT ratio. At step 904, an inquiry is made as to whether the LBO-to-HT ratio is within a predefined normal range. If so, no additional action is necessary, and the operating conditions continue to be monitored. If, however, the LBO-to-HT ratio is not within a predefined normal range, a further inquiry is made at step 906 as to whether the HT value is within a predefined normal range. If not, at step 908, a decision not to tune the combustor is made. Alternatively, if the HT value is within a predefined normal range, then at step 910, the combustor is tuned.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. One or more non-transitory computer-readable media that, when invoked by computer-executable instructions, perform a method for tuning a combustor of a gas turbine engine based on one or more monitored operating conditions, the method comprising:
monitoring one or more operating conditions of a gas turbine engine, wherein the one or more operating conditions include, at least, a low frequency tone, a high frequency tone, and a ratio of only the low frequency tone to only the high frequency tone;
determining whether the ratio of only the low frequency tone to only the high frequency tone is within a first predefined normal range;
determining whether the high frequency tone is within a second predefined normal range;
if the ratio of only the low frequency tone to only the high frequency tone is within the first predefined normal range, determining not to tune the combustor of the gas turbine engine;
if the ratio of only the low frequency tone to only the high frequency tone is not within the first predefined normal range, and the high frequency tone is not within the second predefined normal range, determining not to tune the combustor of the gas turbine engine; and
if the ratio of only the low frequency tone to only the high frequency tone is not within the first predefined normal range and the high frequency tone is within the second predefined normal range, tuning the combustor of the gas turbine engine in order to avoid a lean blowout.

2. The media of claim 1, wherein tuning the combustor of the gas turbine engine comprises adjusting a fuel-flow split to the combustor.

3. The media of claim 1, wherein the low frequency tone is a lean blowout value and the high frequency tone is a hot tone value.

4. The media of claim 1, wherein the tuning is performed for all combustors of the gas turbine engine.

5. The media of claim 1, wherein the tuning the combustor is performed automatically, without user intervention.

6. The media of claim 1, wherein the tuning the combustor is performed manually by a user.

7. The media of claim 1, wherein the first predefined normal range is a first predefined threshold value and the second predefined normal range is a second predefined threshold value.

8. The media of claim 7, wherein the second predefined threshold value comprises a value corresponding to at least one of an artificially low hot tone value and a low hot tone value indicative of noise in a hot tone signal.

9. The media of claim 7, wherein the first predefined threshold value is defined by a user.

10. The media of claim 7, wherein the first predefined threshold value is 0.5.

11. A system for automatically tuning a combustor of a gas turbine engine based on one or more monitored operating conditions, the system comprising:
an acquisition component for receiving values associated with one or more operating conditions of a gas turbine engine, wherein the one or more operating conditions include, at least, a low frequency tone, a high frequency tone, and a ratio of only the low frequency tone to only the high frequency tone;
a processing component for determining that a value associated with the ratio of only the low frequency tone to only the high frequency tone is not within a first predefined normal range, and for determining that a value associated with the high frequency tone is within a second predefined normal range; and
an adjustment component for adjusting a fuel-flow split to the combustor of the gas turbine engine in order to avoid a lean blowout, based on the determining steps performed by the processing component.

12. The system of claim 11, further comprising an alarm indicator for providing an alert that one of the one or more operating conditions falls outside a normal range associated with the one of the one or more operating conditions.

13. The system of claim 11, wherein tuning the combustor of the gas turbine engine comprises adjusting a fuel-flow split to the combustor.

14. One or more non-transitory computer-readable media that, when invoked by computer-executable instructions, perform a method for tuning a combustor of a gas turbine engine based on one or more monitored operating conditions, the method comprising:
monitoring one or more operating conditions of a gas turbine engine, wherein the one or more operating conditions include, at least, a low frequency tone, a high frequency tone, and a ratio of only the low frequency tone to only the high frequency tone;
determining whether the ratio of only the low frequency tone to only the high frequency tone is within a first predefined normal range;
determining whether the high frequency tone is within a second predefined normal range;
if the ratio of only the low frequency tone to only the high frequency tone is not within the first predefined normal range but the high frequency tone is outside the second predefined normal range indicating that its value is artificially low, determining to not tune the combustor based on the one or more monitored operating conditions; and
if the ratio of only the low frequency tone to only the high frequency tone is not within the first predefined normal range and the high frequency tone is within the second predefined normal range, initiating tuning of the combustor such that the ratio of only the low frequency tone to only the high frequency tone not being within the predefined normal range indicates susceptibility of a particular can to lean blowout.

15. The media of claim 14, wherein the low frequency tone is a lean blowout value.

16. The media of claim 15, wherein the high frequency tone is a hot tone value.

17. The media of claim 14, wherein initiating tuning of the combustor comprises adjusting a fuel-flow split to the combustor by a first predefined increment.

18. The media of claim 17, further comprising, subsequent to the adjusting the fuel-flow split by the predefined increment, monitoring the one or more operating conditions to obtain a new low frequency tone, a new high frequency tone, and a new ratio of only the new low frequency tone to only the new high frequency tone.

19. The media of claim 18, further comprising
determining whether the new ratio is within the first predefined normal range;

determining whether the new high frequency tone is within the second predefined normal range; and if the new ratio is not within the first predefined normal range and the new high frequency tone is within the second predefined normal range, adjusting the fuel-flow split by a second predefined amount.

* * * * *